US009868895B2

(12) United States Patent
Sheehy et al.

(10) Patent No.: US 9,868,895 B2
(45) Date of Patent: *Jan. 16, 2018

(54) METHOD OF GRAVITY ASSISTED MICROBIOLOGICALLY ENHANCED OIL RECOVERY BY IMPROVING THE DISTRIBUTION OF NUTRIENTS INTRODUCED INTO OIL PRODUCING ROCK FORMATIONS

(71) Applicant: TITAN OIL RECOVERY, INC., Beverly Hills, CA (US)

(72) Inventors: Alan James Sheehy, Minyama (AU); Bradley Ray Govreau, Spring, TX (US); Colin Kenneth Hill, San Dimas, CA (US); Michael Thomas Carroll, Glendora, CA (US); Brian W. G. Marcotte, Rolling Hills, CA (US)

(73) Assignee: Titan Oil Recovery, Inc., Beverly Hills, CA (US)

( * ) Notice: Subject to any disclaimer, the term of this patent is extended or adjusted under 35 U.S.C. 154(b) by 185 days.

This patent is subject to a terminal disclaimer.

(21) Appl. No.: 14/307,048

(22) Filed: Jun. 17, 2014

(65) Prior Publication Data

US 2014/0367089 A1    Dec. 18, 2014

Related U.S. Application Data

(60) Provisional application No. 61/836,418, filed on Jun. 18, 2013.

(51) Int. Cl.
*C09K 8/582*    (2006.01)

(52) U.S. Cl.
CPC .................................... *C09K 8/582* (2013.01)

(58) Field of Classification Search
None
See application file for complete search history.

(56) References Cited

U.S. PATENT DOCUMENTS

| 4,905,761 | A | | 3/1990 | Bryant | |
|---|---|---|---|---|---|
| 4,971,151 | A | * | 11/1990 | Sheehy | C09K 8/905 166/246 |
| 5,083,610 | A | | 1/1992 | Sheehy | |
| 5,163,510 | A | * | 11/1992 | Sunde | C09K 8/905 166/246 |
| 2001/0036667 | A1 | | 11/2001 | Tayebi et al. | |
| 2001/0045279 | A1 | | 11/2001 | Converse et al. | |
| 2014/0182840 | A1 | | 7/2014 | Sheehy et al. | |

* cited by examiner

*Primary Examiner* — Angela M DiTrani
(74) *Attorney, Agent, or Firm* — Zarley Law Firm, P.L.C.

(57) ABSTRACT

A method of improving oil recovery includes the step of selecting an oil containing rock formation having geologic structures and well completions with vertical permeability that allow a structurally high water injection point. Through a series of analyzes a nutrient water mixture is determined and injected at the injection point to stimulate resident microorganisms through gravity dispersion of nutrient materials. A period of limitation is allowed to permit changes in the size or hydrophobic properties of the microorganisms. Through interaction with the stimulated resident microorganisms, oil, trapped in a pore space, is freed to accumulate with upward gravity separation for production.

10 Claims, 1 Drawing Sheet

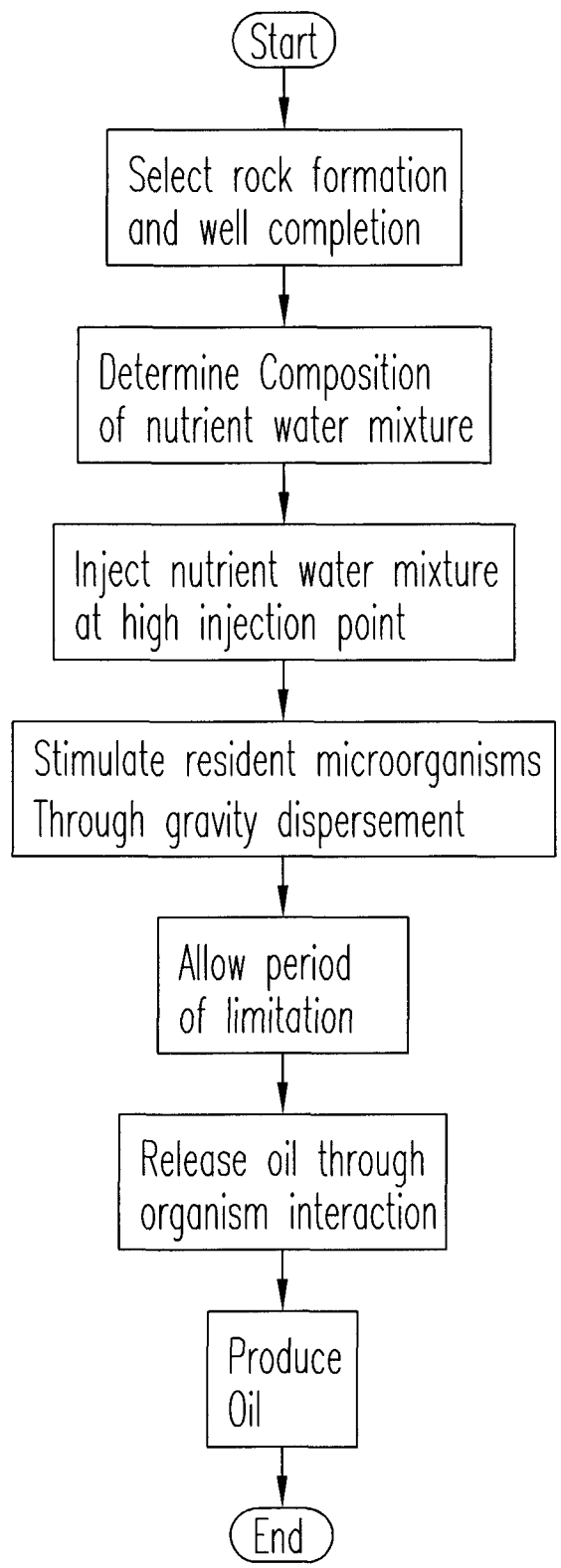

METHOD OF GRAVITY ASSISTED MICROBIOLOGICALLY ENHANCED OIL RECOVERY BY IMPROVING THE DISTRIBUTION OF NUTRIENTS INTRODUCED INTO OIL PRODUCING ROCK FORMATIONS

CROSS REFERENCE TO RELATED APPLICATION

This application claims the benefit of U.S. Provisional Application No. 61/836,418 filed Jun. 18, 2013.

BACKGROUND OF THE INVENTION

Nutrient supplementation of water flood oil recovery processes has been shown to be effective in conventional water injection implemented as a means of secondary and tertiary recovery. This invention relates to the process of using resident microorganisms in the geologic oil formation to assist in oil recovery to improve oil production rate and ultimate recovery from the oil reservoir. The invention uses an unconventional method using low concentrations and controlled volume and rate of injection of nutrient materials through periodic nutrient supplementation of water injection through wells that are structurally located near the top of the oil producing rock formation to take advantage of gravity to disperse the nutrients downward through the oil bearing strata. Once the nutrient materials are injected into selected wells, gravity causes the injected water-nutrient mixture to percolate downward, driven by specific gravity differences between the injected nutrient mixture and the oil contained in the reservoir thus increasing the effectiveness of the distribution of the nutrients. The addition of nutrient and subsequent nutrient deprivation stimulates resident microorganisms to change both physiologically and metabolically resulting in specific groups of microbes becoming interactive with the oil in the reservoir leading to changes to the flow characteristics of the oil contained in the oil-bearing strata. Once released, this oil can then be produced in nearby oil production wells or from the well where the injection of nutrients took place utilizing a cyclic process consisting of an alternating and repeating, inject, produce, inject, produce sequences. This invention contemplates both a novel injection site and a novel nutrient distribution method to improve the stimulation of resident microorganisms in an oil reservoir to increase the recovery of oil.

An objective of the present invention is to provide a method of improving oil recovery through the use of a nutrient package and gravity dispersion.

Another objective of the present invention is to provide a method of improving oil recovery in oil containing rock formations.

These and other objectives will be apparent to those of ordinary skill in the art based upon the following written description, drawing and claims.

SUMMARY OF THE INVENTION

A method of improving oil recovery includes the step of selecting an oil containing rock formation having geologic structures and well completions with vertical permeability that allow a structurally high water injection point. Through a series of analyses a nutrient water mixture is determined and injected at the injection point to stimulate resident microorganisms through gravity dispersion. A period of limitation is allowed to permit changes in the size or hydrophobic properties of the microorganisms. Through interaction with the stimulated resident microorganisms, oil, trapped in a pore space, is freed to accumulate with upward gravity separation for production.

BRIEF DESCRIPTION OF THE DRAWING

The FIGURE is a flow diagram of a method for enhancing oil recovery.

DETAILED DESCRIPTION OF PREFERRED EMBODIMENTS

With reference to the FIGURE, disclosed is a method to increase oil recovery from reservoirs of all types including but not limited to: sandstone, carbonates, conglomerate, shale, siltstone or other rock types found to be responsive to water injection.

The disclosed method targets oil-containing rock formations that have geologic structures and well completions that will allow an unconventional, structurally high, water injection point to take advantage of the reservoir's vertical permeability and the gravity effects on the nutrient-water mixture causing the water mixture to move downward through the oil reservoir and allowing the stimulated microbes to more effectively come into contact with the oil.

The method for injection of a nutrient-water mixture in a structurally high location is generally counter-intuitive in oil field production practice. Controlled volume, periodic injection of the nutrient formula into production or injection wells allows gravity to aid in the dispersal of the nutrient materials to affect a significant volume of the oil containing rock formation.

The injection rate for the nutrient materials is generally controlled between 1 barrel per minute and 10 barrels per minute to optimize the displacement of the nutrient mixture into the reservoir rock formation.

The method describes a novel nutrient delivery technique for enhancing the oil recovery by stimulation of the population of resident microorganisms found in oil reservoirs with field specific nutrient materials injected into wells in a structurally high portion of the oil reservoir.

The method of increasing and enhancing the number of resident microorganisms is accomplished by applying a specific nutrient formulation to stimulate the resident microorganisms and then allowing a period of deprivation that changes the organisms physiology with respect to size or hydrophobic properties that favor an interaction with the oil contained in the oil reservoir rock ultimately increasing production from the reservoir. Specifically, in one embodiment, this stimulation and modification of the resident microorganisms changes the size or hydrophobic properties of the treated microbes. Typical reductions in the microorganism cell volume are 50% or more.

The stimulation of certain resident microorganisms is followed by specific nutrient limitation. In one embodiment, the cycle of nutrient supplementation and depletion will be repeated multiple times to optimize the oil recovery efficiency.

Certain nutrient formulations have been shown to be highly effective in microbe-mediated oil release in reservoirs over a wide range of temperature and salinity. The invention contemplates the introduction of a specific package of nutrients in a liquid form that can be diluted to produce a range of concentrations from 100 grams per liter to 0.0001 grams per liter in the treated volume. Specific packages of nutrients facilitate microbe-mediated oil release in reservoirs where biological life occurs. In one embodiment specific nutrient formulations facilitate microbe-mediated oil release in reservoirs up to 130 C and 150,000 ppm total dissolved solids (TDS).

The stimulation and subsequent enhancement of certain resident microorganisms is to a sufficient level that oil flow characteristics change, thereby improving oil recovery.

The injection wells may be completed vertically or horizontally, or any intermediate inclination angle in the oil formation.

A specific package of nutrients, not derived from sugars, is delivered via various configurations of well completions.

In one embodiment, a nutrient package that creates specific microbial activity by applying a controlled concentration (dilution) and a controlled treatment volume and treatment pumping rate based on reservoir characteristics are used to yield an optimum oil recovery mechanism.

The nutrient package is prepared in a liquid form to improve the oil production performance of both water flooded and non-water flooded reservoirs. The liquid form can be diluted to produce a range of concentrations from 100 grams per liter to 0.0001 grams per liter depending on the prior laboratory analysis of the produced reservoir fluids.

As shown in the FIGURE, the method uses a series of analyses that lead to formulation of a specific nutrient package to perform a microbiological response analysis under actual reservoir conditions in combination with gravity dispersion of nutrients with the intent of refining the treatment of a reservoir to optimize changes in the resident microorganisms to the hydrophobic forms that enhance the recovery of oil.

The method also contemplates uses of a genetic analysis of microorganisms in produced fluids to aid in the determination of the presence of oil interactive microorganisms with the capacity to improve flow characteristics of the oil within the rock formation and the overall ecology of the resident microbes.

In one embodiment varying the specific gravity of the nutrients supplementation may allow an optimization of the gravity assisted nutrient distribution.

Definitions:

"Gravity Dispersion" involves the natural movement and separation of fluids of different specific gravity (density) within an oil and water containing rock formation. Water injected in a structurally high position in reservoirs with sufficient vertical permeability will allow the water to percolate downward through the water phase of the oil reservoir coming in contact with the oil that is trapped in the reservoir pore space. In turn, as oil is released by the interaction with stimulated resident microorganisms, the oil will be free to accumulate with upward gravity driven separation and be produced in nearby production wells or in the treated well itself. Gravity Dispersion can be effective in oil formations that have good vertical permeability or in geologic formations where geologic uplift and tilting has provided a high elevation gradient within the oil reservoir.

"Completions" is the term referencing the final production or injection configuration at the end of a drilling project. When an oil production or water injection well is drilled, progressively smaller steel pipes (known as "casing") are installed and the annular space is cemented to bond between the steel pipe and the drilled rock surface to keep the drilled hole from collapsing and to prevent "cross flow" from layer-to-layer if multiple, porous producing zones are present. The process continues from the surface until the total target depth of the well has been reached. Depending on the depth of the drilling, the steel pipes will be set at various drill depths and may range in diameter from as much as 30 inches at the surface down to 4½ inches or less in diameter in the lowest section of the well. Vertical wells and horizontal wells are two common types of completions. However, wells can be drilled at any angle between vertical and horizontal depending on geologic characteristics of the rock formation.

"Resident Microorganisms" are defined as microorganisms that occur in oil reservoirs, prior to the envisioned treatment, irrespective of the microorganism's origin or where they occur within the oil-bearing strata.

What is claimed:

1. A method for improving oil recovery comprising the steps of:
    selecting an oil-containing rock formation having geologic structures and well completions having a vertical permeability such that a water injection point is suitably located at a structurally high injection point of the oil-containing rock formation, wherein the structurally high injection point is above a water phase of the oil reservoir;
    injecting at the water injection point a nutrient-water mixture that stimulates resident microorganisms through gravity dispersion wherein the nutrient-water mixture percolates downward from the structurally high injection point through the water phase of the oil reservoir and the resident microorganisms contact oil trapped in a pore space during percolation; and
    releasing oil trapped in a pore space through interaction of the oil with the stimulated resident microorganisms such that the oil is freed to accumulate with upward gravity separation for production.

2. The method of claim 1 wherein injection of the nutrient water mixture occurs at a controlled volume and rate of injection.

3. The method of claim 2 wherein the controlled volume and rate of injection is between one and ten barrels per minute.

4. The method of claim 1 further comprising the step of allowing a period of nutrient limitation that changes the resident microorganisms physiology with respect to size or hydrophobic properties.

5. The method of claim 4 wherein a cell volume of the resident microorganism is reduced by fifty percent or more.

6. The method of claim 1 wherein the nutrient water mixture is diluted to produce a concentration between 100 grams per liter to 0.0001 grams per liter in a treated volume.

7. The method of claim 1 further comprising the step of determining the nutrient water mixture through a series of analyses under actual reservoir conditions with gravity dispersion.

8. The method of claim 1 wherein a series of analyses are conducted that lead to a specific nutrient formulation to create the nutrient-water mixture.

9. The method of claim 1 further comprising the step of conducting a genetic analysis of the resident microorganisms.

10. A method for improving oil recovery comprising the steps of:
    selecting an oil-containing rock formation having geologic structures and well completions having a water injection point located at a structurally high injection point of the oil-containing rock formation, wherein the structurally high injection point is above a water phase of the oil reservoir;
    injecting at the water injection point of a single well a nutrient-water mixture that stimulates resident microorganisms through gravity dispersion;

releasing oil trapped in a pore space through interaction of the oil with the stimulated resident microorganisms such that the oil is freed to accumulate with upward gravity separation for production; and wherein the nutrient-water mixture percolates downward from the structurally high injection point.

\* \* \* \* \*